United States Patent [19]

Mason et al.

[11] 3,879,255
[45] Apr. 22, 1975

[54] SEALANT HAND APPLICATOR
[75] Inventors: Richard H. Mason; Curtis W. Mayott, both of Glen Falls, N.Y.
[73] Assignee: Norton Company, Troy, N.Y.
[22] Filed: Oct. 18, 1972
[21] Appl. No.: 298,784

[52] U.S. Cl. ............................ 156/527; 156/579
[51] Int. Cl. ................... B32b 31/18; B32b 31/20
[58] Field of Search .......... 156/527, 579, 523, 526, 156/574, 577; 225/55, 88, 89, 106

[56] References Cited
UNITED STATES PATENTS

| 2,296,663 | 9/1942 | Gruber | 225/89 |
|---|---|---|---|
| 2,739,725 | 3/1956 | Smith | 156/527 |
| 3,144,185 | 8/1964 | Shirejian | 225/56 |
| 3,567,557 | 3/1971 | Kingery et al. | 156/577 |
| 3,645,831 | 2/1972 | Thaeler | 156/527 |
| 3,730,815 | 5/1973 | Terzian | 156/527 |

*Primary Examiner*—Charles E. Van Horn
*Assistant Examiner*—M. G. Wityshyn
*Attorney, Agent, or Firm*—Oliver W. Hayes

[57] ABSTRACT

Apparatus for application of a flat sealant, by hand, to a straight edge is provided comprising a pressure plate, an edge guide, a sealant guide, and a means to hold onto and move the applicator along the edge of the member on which the sealant is to be applied.

5 Claims, 3 Drawing Figures

SEALANT HAND APPLICATOR

BACKGROUND OF THE INVENTION

1. Field of the Invention

This invention relates to a simple apparatus for application, by hand, of a sealant material, in particular, a sealant comprising a pressure-sensitive adhesive foam tape.

2. Description of the Prior Art

Various means have been provided for vibration dampening of metal members and, in some instances, to also, or instead, provide a moisture, dust, weather, and the like seal where metal or other members are in combination with other metal members or the like.

One manner of providing a seal between two members in the past has involved the use of a so-called "putty tape." This tape comprises a layer of putty on a release carrier, and it has been used extensively in various sealing applications including use in mobile homes, recreational vehicles, and the like. Nevertheless, its use has been accompanied with certain disadvantages, in particular, because of its rather undesirable characteristic of flowing under pressure. This feature often results in putty flowing out the side of the member being sealed presenting an unsightly appearance and necessitating trimming or otherwise removing. Another problem, somewhat related to the one above-mentioned, associated with the use of putty tape results from the fact that the putty tape and accompanying release carrier are not coextensive with one another. Thus, even though one is able to align the release carrier with the edge of the member to be sealed, for example, the edge of a door, window, or vent in a mobile home, he is never certain of the exact alignment of the putty tape until after removing the release carrier. Sometimes the putty tape is so out of alignment that trimming is required once the members to be sealed are joined together. The problem may even be compounded where bringing the members to be sealed together results in flow out of the putty tape.

Sealants now being manufactured, particularly those comprising a pressure-sensitive adhesive coating on a polyvinyl chloride foam backing member have now obviated the above-mentioned problems. These sealants and mounts are provided in a constant desired width in combination with a coextensive release liner and may be of various thicknesses and densities.

Although foam sealants are now used in a host of applications, e.g., building construction, mobile homes, recreational vehicles, marine construction, etc., its use would be even more readily accepted with better means of application. Accordingly, we have developed an applicator by means of which a sealant can be more easily applied to a straight edged member to be sealed.

SUMMARY OF THE INVENTION

The invention disclosed herein comprises a hand applicator by means of which sealants can be applied to various substrates, and in particular to window trim and the like in recreation vehicles, trailers, campers, and the like. The applicator comprises a body member along which the sealant is transported and which permits pressure to be exerted on the sealant during appliction. Dependent from one side of the pressure plate body member is an edge guide for locating one edge of the sealant on the edge of the member to be sealed. This alignment is maintained by a sealant guide also dependent from the pressure plate.

Quite advantageously the applicator herein disclosed makes possible the application of a foam tape sealant to various substrates, accurately, rapidly, easily, and economically as opposed to application entirely by hand.

BRIEF DESCRIPTION OF THE DRAWING

The invention is described hereinafter in greater detail by reference to the drawing in which.

DETAILED DESCRIPTION OF THE INVENTION AND PREFERRED EMBODIMENTS

Figure 1:
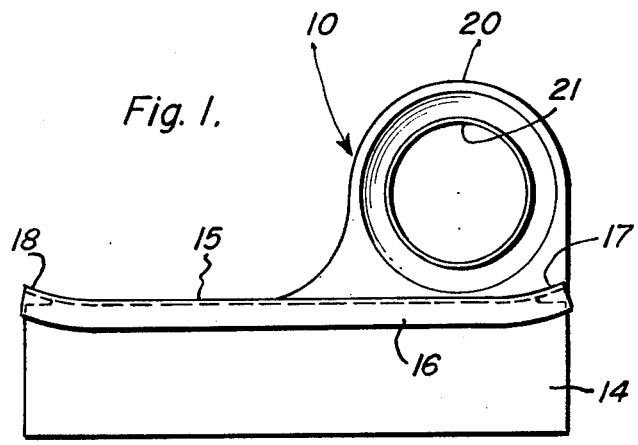
FIG. 1 is a side view, looking at the sealant guide side, of an embodiment of a hand applicator in accordance with this invention.
Figure 3:
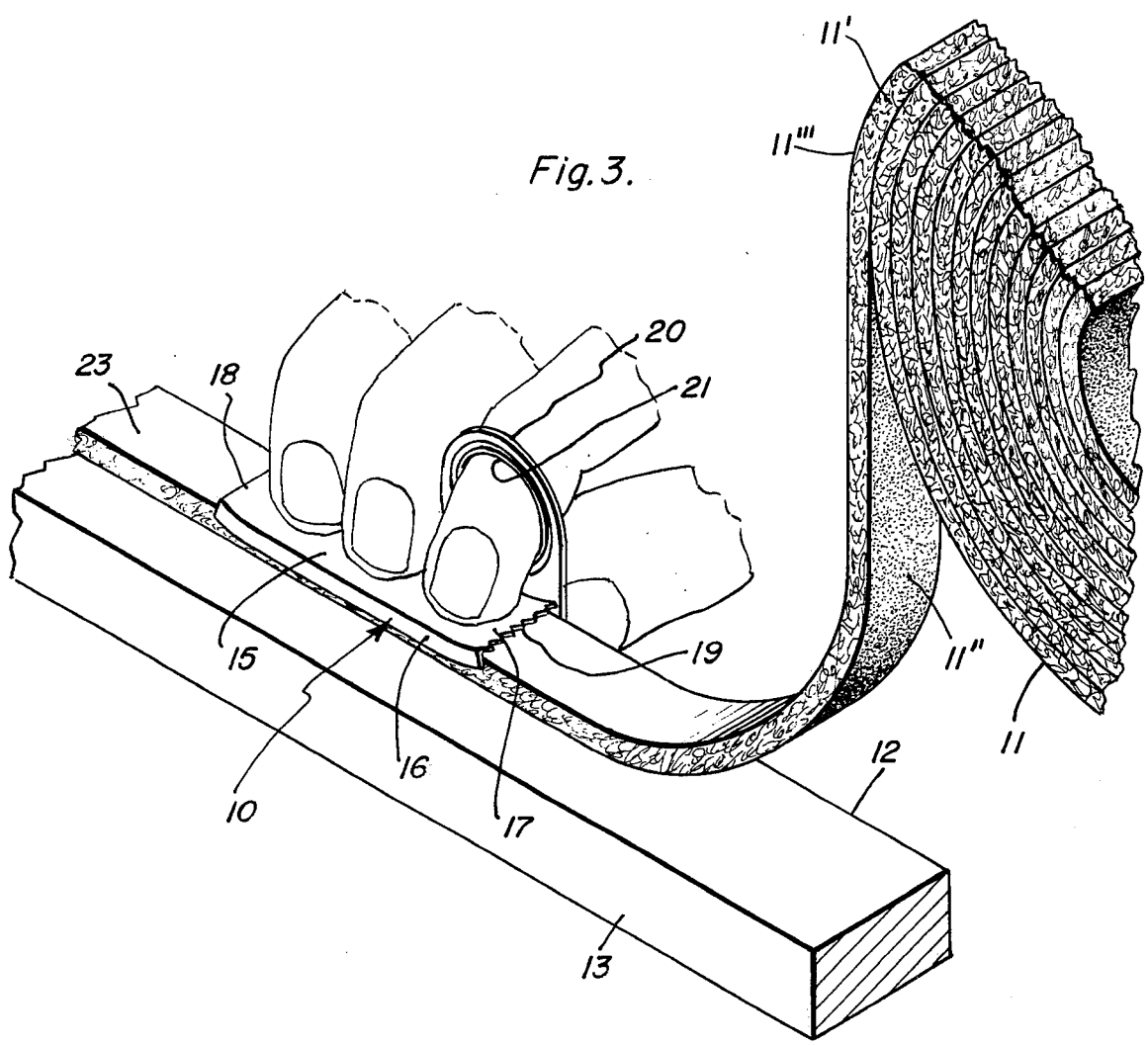
FIG. 3 is a view in perspective showing use of the applicator in applying a foam sealant to a straight edged member to be sealed.

Turning now to the drawings there is shown in FIG. 1 thereof an applicator 10, in accordance with the invention, for application of a foam sealant 11, by hand, along the straight edge 12 of a substrate or member 13 to be sealed, as shown in FIG. 3.

Foam sealant 11 comprises a foam backing member 11', having on the front side thereof a pressure-sensitive adhesive layer 11''. An interliner 11''' is interwound with sealant 11 thereby to prevent undesirable adhesion between backing member 11' and adhesive layer 11'' in roll form and to provide desirable unwind characteristics. In some instances, rather than an interliner a release coating can be provided on the back surface of the backing member. Sealants of this type are available commercially in various widths, thicknesses, and densities of various materials and are believed to require no detailed explanation herein. One such foam sealant comprises a closed cell polyvinyl chloride foam and is available commercially from Norton Company assignee of the present invention.

Applicator 10 is provided with an edge guide 14 (FIG. 2) which depends from one side of a body member or so-called "pressure plate" 15. A sealant guide 16 depends from the other side of pressure plate 15 and in the same direction as edge guide 14. The ends 17, 18 of this elongated body member are desirably turned up or rounded, as shown in FIG. 1, so as to provide smooth sliding of the applicator on the sealant material during application to a desired member.

Figure 2:
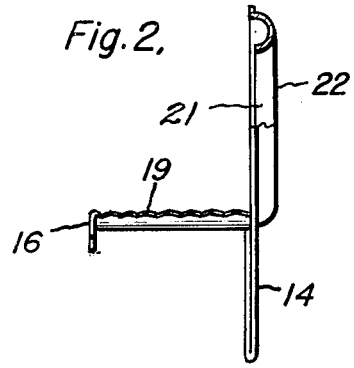
FIG. 2 is an end view of the applicator shown in FIG. 1 looking at the right end thereof as shown in that figure.

The leading end of pressure plate 15 is serrated, as shown by reference numeral 19 in FIG. 2 of the drawing. This, of course, provides an edge whereby the desired length of sealant can be cut off from a roll thereof, as it is being applied to the member to be sealed. Obviously, the trailing end of pressure plate 15 can be provided with a serrated cutting edge rather than, or in addition to that provided on, the leading end.

In the drawing, edge guide 14 and sealant guide 16 are shown to extend perpendicularly from pressure plate 15. However, one will appreciate, it is believed, that particularly edge guide 14 may extend at some other angle with respect to the pressure plate. The edge of the particular substrate or member to be sealed on which the sealant is being applied will determine this angle.

Opposite to edge guide 14, and perpendicular to pressure plate 15, is a holding means 20 in which is provided a circular opening 21 large enough in diameter for insertion of, e.g., one's index or forefinger, during use of the applicator. Circular opening 21 is rounded, as shown by reference number 22, or otherwise made smooth, so as not to present a sharp edge to one's finger.

Other holding means may obviously be provided rather than the one specifically shown herein. One alternative example that comes to mind is a right angled piece attached to and parallel with pressure plate 15 so that one end can be gripped by the fingers. Holding means 20 can, of course, be provided at either end of the pressure plate, as desired, or, for that matter, can even be centered with respect thereto. The holding means can also be pivotably mounted whereby it can be pivoted to one end or the other of the applicator depending on whether the one using it is right or left handed.

Applicator 10 can obviously be made from any of various materials, e.g., various plastic materials such as polyvinyl chloride, polyamides, polyethylene, etc., and metal. Where made of plastic, it may be injection molded or even machined from a larger piece of the desired plastic material. It is preferred, however, that the applicator be entirely stamped from a piece of metal. This offers a fast, relatively economical, and simple manner of manufacture of the applicator. However, it is possible to stamp or die cut the various members thereof and join them together in some manner, e.g., adhesive bonding.

Obviously, the size of the applicator and its various components will depend on the width and thickness of the particular sealant with which it is to be used. In general, the spacing between edge guide 14 and sealant guide 16 will be from about one-half inch to 1 inch. However, obviously wider applicators can be manufactured. The applicator width should, however, correspond to the width of foam sealant to be applied.

To use the applicator shown, one takes a roll of foam sealant 11 comprising polyvinyl chloride foam pressure-sensitive tape or the like in his left hand (a partial roll is shown in FIG. 3) while applying the free end 23 thereof to the member 13 to be sealed. The free end of foam sealant 11 is positioned (adhesive against member 13) so that one edge of sealant 11 is aligned with edge 12 of member 13, after which applicator 10 is positioned on top of the foam sealant backing member. Thus, sealant 11 is located in and travels along the channel formed by edge guide 14, pressure plate 15, and sealant guide 16. Applicator 10 is moved with one's right hand along the strip of sealant 11 as it is unwound from the roll thereof. Edge guide 14 moves along edge 12 of the member to be sealed and with sealant guide 16, parallel thereto, maintains sealant 11 in alignment with the straight edge. This movement presses foam sealant 11 into adhering contact with member 13. When the desired length of sealant has been applied, one merely pulls the sealant back over the serrated edge of the applicator and cuts it.

As many different embodiments of our invention will occur to those skilled in the art, it is to be understood that the specific embodiment of the invention as presented herein is intended by way of illustration only and not limiting upon the invention, but that the limitations thereon are to be determined only from the appended claims.

What we claim is:

1. Applicator for application of a foam sealant adjacent to a straight edge of a desired substrate comprising an elongated pressure plate having ends which are slightly turned up for smooth sliding pressure engagement with the sealant, a serrated cutting edge on at least one end of the pressure plate, an edge guide extending between the ends of, fixed to and dependent from one side of said pressure plate for sliding engagement with said straight edge, a holding means associated with and extending from said edge guide for holding the applicator during use, and a sealant guide extending between the ends of and fixed to the pressure plate, spaced from said edge guide and dependent perpendicularly from said pressure plate and in the same direction as said edge guide to provide an elongated channel adjacent the pressure plate and between the spaced guides through which the sealant passes whereby said sealant is maintained in position as applied along said straight edge.

2. Applicator according to claim 1 wherein said edge guide depends perpendicularly from said pressure plate.

3. Applicator according to claim 1 wherein said sealant guide extends from said pressure plate a distance approximately the thickness of the sealant to be used therewith.

4. Applicator according to claim 1 wherein said holding means comprises a means having a circular opening therein for insertion of at least one finger.

5. Applicator according to claim 4 wherein said holding means depends from said pressure plate in alignment with said edge guide and in the opposite direction thereto.

* * * * *